United States Patent [19]

Svehaug

[11] 4,426,289

[45] Jan. 17, 1984

[54] ROTARY SCREEN LIQUID-SOLID SEPARATOR

[76] Inventor: Henry V. Svehaug, 114 SW. 5th St., Milton-Freewater, Oreg. 97862

[21] Appl. No.: 289,304

[22] Filed: Aug. 3, 1981

[51] Int. Cl.$^{3}$ .............................................. B01D 33/10

[52] U.S. Cl. ..................................... 210/403; 209/284

[58] Field of Search ............... 210/396, 386, 402, 403; 209/270, 284; 162/314

[56] References Cited

U.S. PATENT DOCUMENTS

| | | | |
|---|---|---|---|
| 1,531,432 | 3/1925 | Haug | 210/403 |
| 1,717,604 | 6/1929 | Haug et al. | 210/403 |
| 3,971,720 | 7/1976 | Swanson et al. | 210/196 |

FOREIGN PATENT DOCUMENTS

| | | | |
|---|---|---|---|
| 2459675 | 6/1979 | France | 210/403 |

OTHER PUBLICATIONS

Brochure: "End Slurry Worries" by Agri-Systems, Inc., Page from Apr. 1979 Issue of PIG International.

*Primary Examiner*—Charles N. Hart

*Assistant Examiner*—Sharon T. Cohen

*Attorney, Agent, or Firm*—Wells, St. John & Roberts

[57] ABSTRACT

A rotary screen separator is described for separating liquids and solids from a slurry. The rotary screen separator includes a cylindrical straining screen rotatably mounted for rotation about a substantially horizontal axis. The separator has a drive for rotating the straining screen at a constant low speed. The separator has a slurry feed means mounted within the interior of the straining screen for spreading the slurry into a thin curtain and directing the curtain downward against a downward moving portion of the straining screen to direct the slurry against the inner surface to enable liquid to pass through the screen to the outer surface and to push the solid materials forward along the inside surface to clean the inside surface. A compression roller is freely mounted within the straining screen for rolling with the moving screen to compress the solid material against the inner surface to remove additional liquid. An auger is mounted axially within the straining screen to engage the solid material and move the material axially to one end of the separator for disposal.

12 Claims, 6 Drawing Figures

10
5
5
50
22
84
92
58
89
97
90
94
16

18
50
62
60
71
67
86
73
84
68
20
65
69
56
54
75
88
89
38
36
97
92
90
94
28
28

ROTARY SCREEN LIQUID-SOLID SEPARATOR

TECHNICAL FIELD

This invention relates to rotary screen separators for separating liquid from solids that carried in a slurry.

BACKGROUND OF THE INVENTION

Many attempts have been made to develop improved ways of handling animal excretion and waste waters, particularly from cattle and hogs. It has been long recognized that ruminant animal feces contain substantial amounts of undigested fibrous material in addition to food and fertilizer values. Generally the liquid and small undissolved particles contain fertilizer and food values such as nitrogen, phosphorous and potassium that are commercially valuable. The larger solid material is generally undigested fibrous material that can be utilized when dried as bedding material for animals.

Most of the prior art devices that have been utilized for such purposes fall within the following categories: (1) rotary screen; (2) brush screen; (3) brush screen press; (4) vibrating screen; (5) rotary screen press; and (6) centrifuge. One rotary screen press system is illustrated in U.S. Pat. No. 3,971,720 granted to Roger Swanson et al., July 27, 1976. Although many attempts have been made to utilize one or more of such liquid/-solid separators, it is found that most fail to provide an efficient, troublefree and inexpensive system for removing large suspended solids from agricultural waste waters.

One of the principal objects of this invention is to provide a rotary screen type separator for removing solids from a slurry in a very efficient, compact manner.

A further object is to provide such a separator that is easily portable to a processing site and has a high capacity for rapidly separating the solid materials from the liquid.

A still further object of this invention is to provide such a separator that is very economical to operate and maintain and which is additionally substantially self-cleaning.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
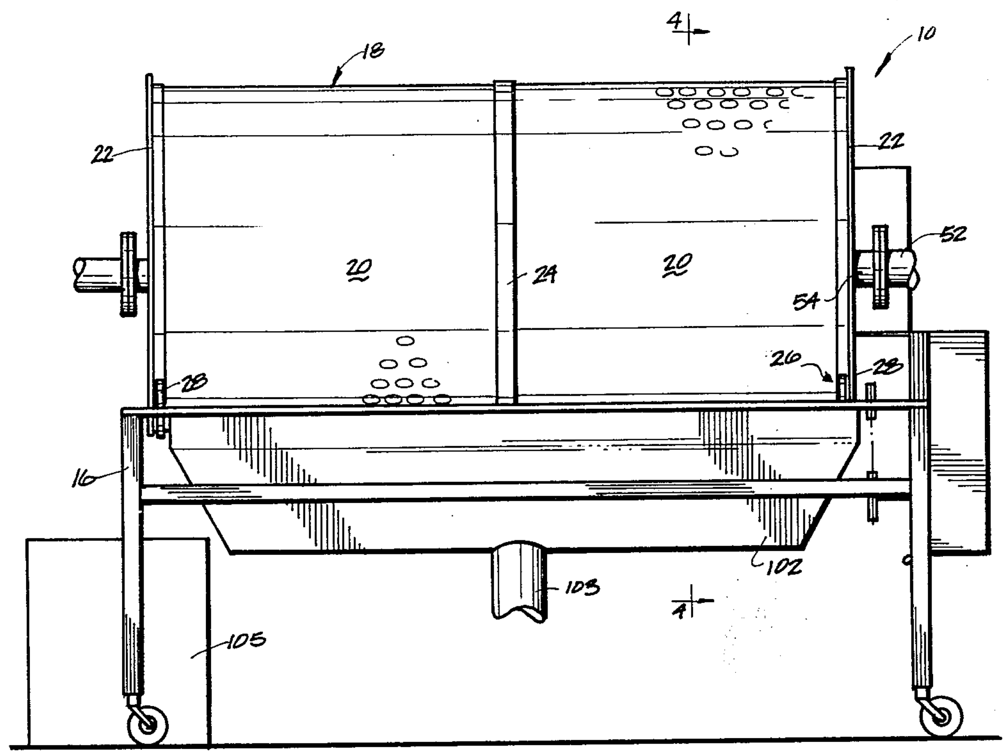
FIG. 1 is a side elevational view of a rotary screen separator which is the subject of this invention.

Referring now in detail to the drawings, there is illustrated in FIG. 1 a rotary screen separator generally designated with the numeral 10 for receiving a slurry of liquid and solids and for separating the solids from the liquids in a very efficient and compact manner. The slurry is indicated by numeral 12 in FIG. 6 with the liquid designated with numeral 13 and the solids with numeral 14.

The rotary screen separator 10 includes a frame 16 that is preferably mobile so that the separator may be easily transported or moved from one location to the other. The separator is relatively lightweight and can generally be pulled or moved by one or more persons into a desired position. Because of its portability, the separator can be moved from one location to another to process a number of slurry compounds without having to devise elaborate pumping and piping systems to carry the slurries to a fixed location.

Figure 2:
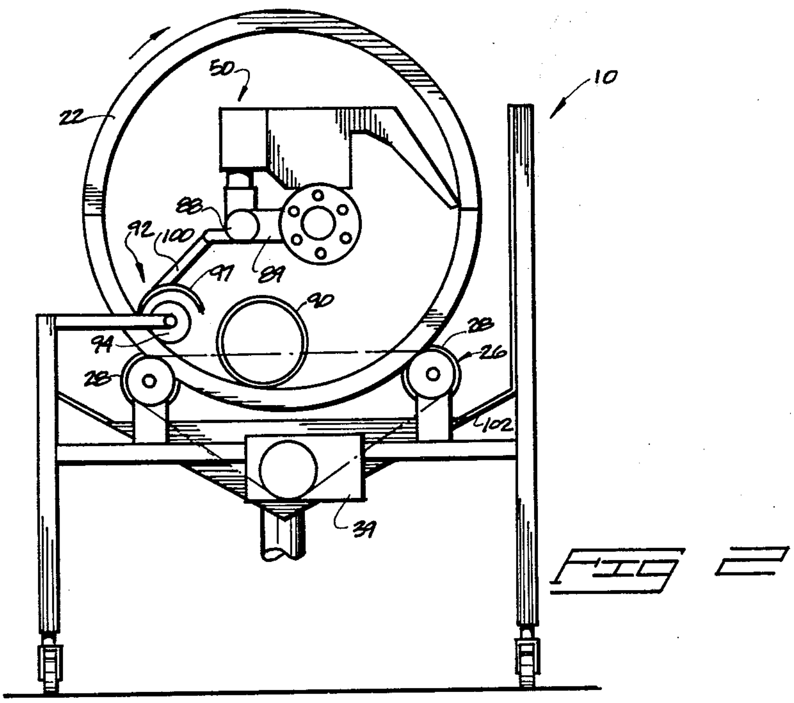
FIG. 2 is an end view of the separator as viewed from the left in FIG. 1.
Figure 3:
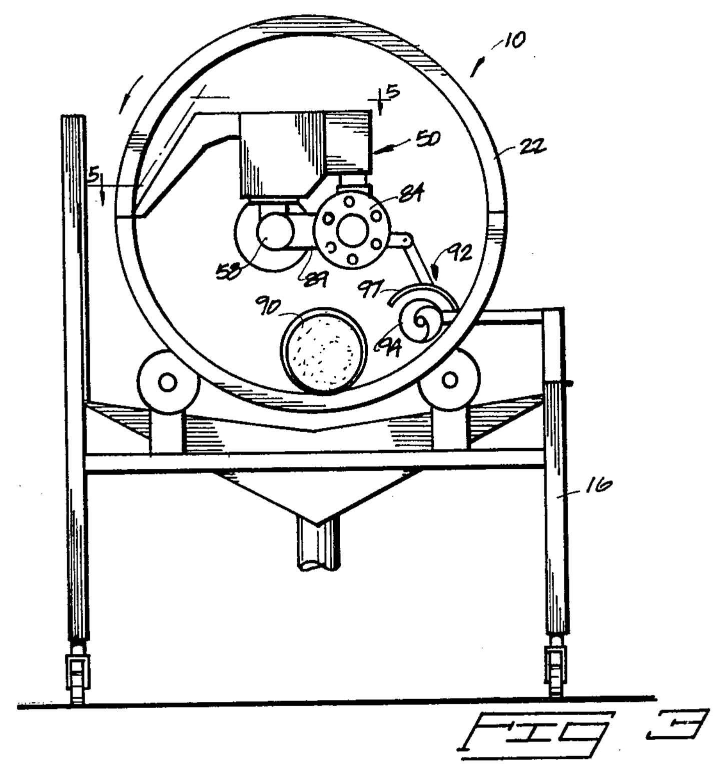
FIG. 3 is an end view opposite to that of FIG. 2 looking at the unit from the right of FIG. 1.
Figure 4:
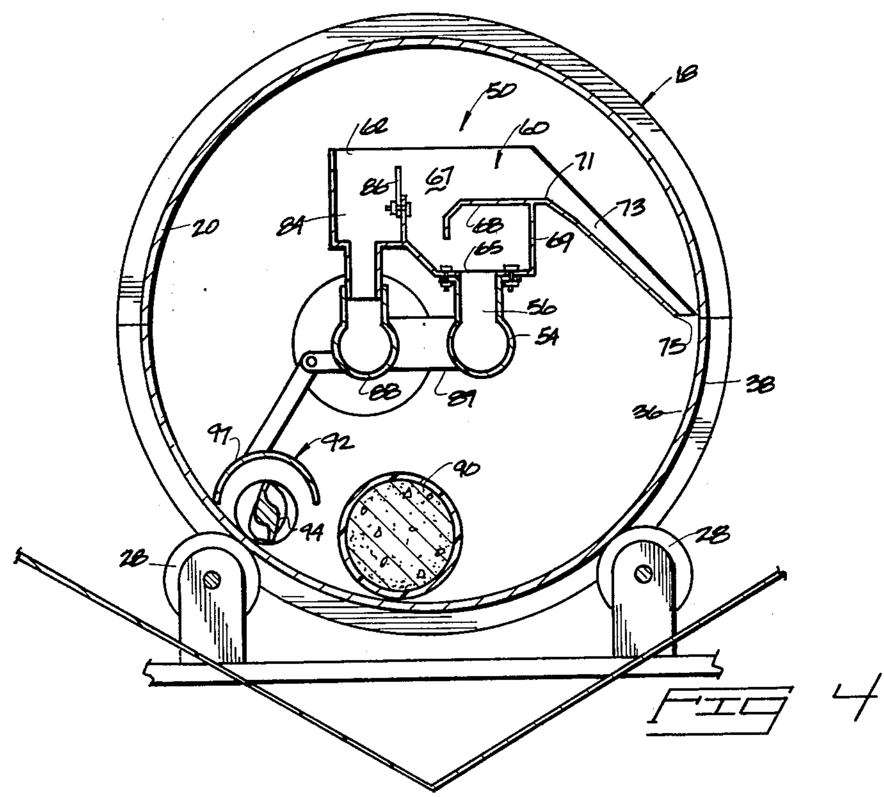
FIG. 4 is a cross-sectional view taken along line 4—4 in FIG. 1.
Figure 6:
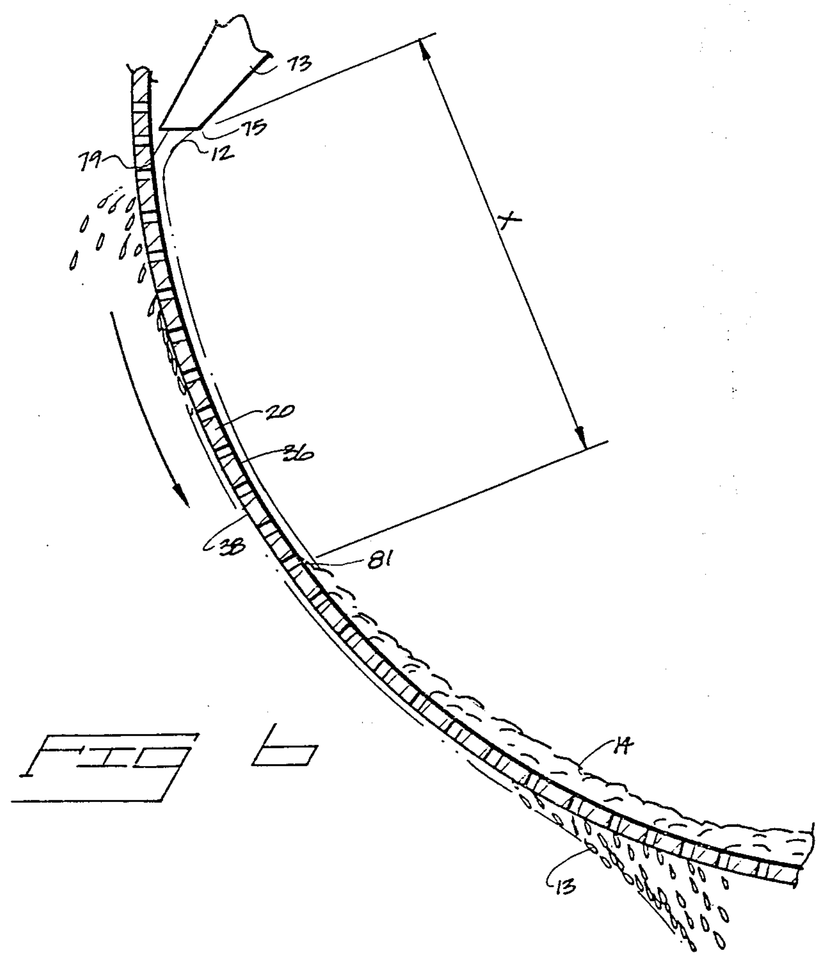
FIG. 6 is an enlarged schematic view showing a separation of the liquid and the solid in a portion of the separator.

One of the principal features of the invention is a cylindrical screen means 18 that may be referred to as a drum or reel. The cylindrical screen means 18 includes strainer screens 20 that are formed as cylinders and are mounted between end flanges 22 and a center flange 24. The cylindrical screen means 18 has a rotational support means 26 for rotationally supporting the cylindrical screen means 18 on the frame 16. Specifically, rotational support means 26 includes rollers 28 (FIG. 4) that are mounted at spaced locations at both ends of the cylindrical screen means 18 for engaging the end flanges 22 as illustrated in FIGS. 1 and 4. Each of the strainer screens 20 is composed of a plate that has a plurality of apertures formed therethrough between a concave surface 36 and a convex outer surface 38 (FIG. 6). Preferably, the apertures are in the neighborhood of 1/16 inch in diameter and are positioned at ⅛ inch on center between apertures. The size and spacing of the apertures may be varied depending upon the nature and composition of the slurry 12 and the application in which the separator 10 is being utilized. The cylindrical screen means 18 is driven by drive means 39 (FIG. 2) that is operatively connected to the rollers 28 for rotating the rollers to slowly rotate the cylindrical screen means 18 about a substantially horizontal axis. For purposes of description and illustration, the straining screen 20 as illustrated in FIG. 3 moves in a circular path counterclockwise about the rotational horizontal axis. The drive means 39 preferably rotates the straining screens 20 rather slowly at approximately three to five revolutions per minute.

The rotary screen separator 10 further includes a relatively stationary slurry feeding means 50 (FIGS. 2–5) interior of the screen means 18 for feeding the slurry to the separator and for directing the slurry against the inner surface 36 of the rotating screen.

Figure 5:
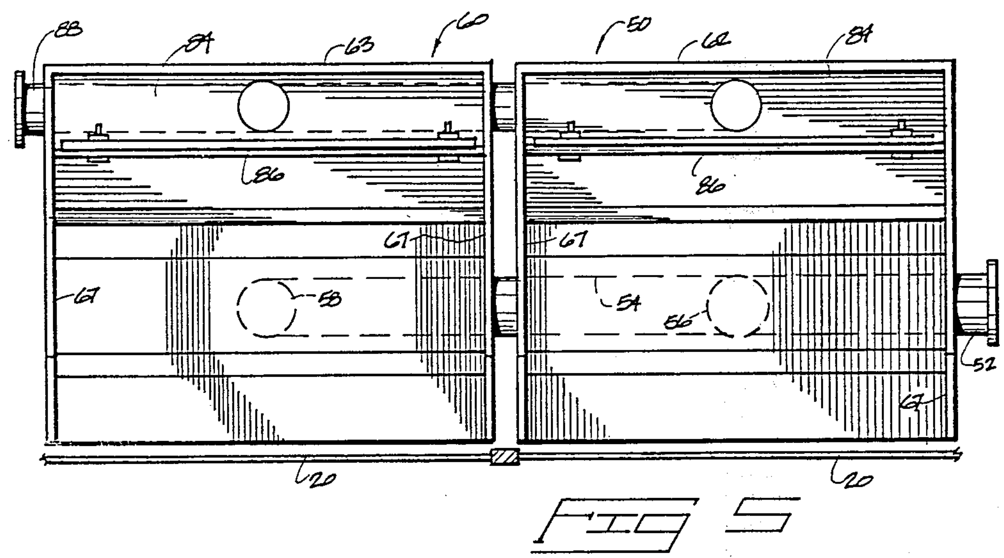
FIG. 5 is a cross-sectional view taken along line 5—5 in FIG. 3.

The slurry feeding means 50 includes an inlet manifold 52 that extends inward from one end of the separator as illustrated in FIGS. 1 and 5. The inlet manifold 52 includes a horizontal tube 54 that extends substantially parallel with the rotational axis of the cylindrical screen means 18. The inlet manifold 52 includes ports 56 and 58 (FIG. 5) that are positioned axially along the horizontal tube 54 for feeding the slurry to an expansion tank 60. In this embodiment, the expansion tank 60 includes two sections 62 and 63 that are positioned longitudinally within the interior of the cylindrical screen means 18. Section 62 is responsible for feeding the slurry 12 to one of the cylindrical screens 20 and the section 63 is responsible for feeding the slurry 12 to the other straining screen 20. Each of the sections 62, 63 have a bottom opening 65 illustrated in FIG. 4 for permitting the slurry to flow through the horizontal tube 54 through the ports 56, 58 and into the expansion tank 60. The expansion tank 60 includes side walls 67 that extend upwardly to contain the slurry. A batfle 68 is formed in the expansion tank 60 to control the flow of the fluid and to reduce turbulence in the tank 60 as the slurry passes through the bottom opening 65.

The expansion tank 60 has a front wall 69 illustrated in FIG. 4 having a weir 71 at a top edge thereof for permitting the slurry to flow over the weir from the expansion tank 60 down a spillway 73. The spillway 73 extends outward and downward to direct the slurry 12 to the inner surface 36 of the straining screens 20. The weir 71 forms the slurry 12 into a curtain of liquid/solid material that flows over the edge weir 71. The spillway 73 permits the liquid to accelerate and increase in velocity as it descends down the spillway 73. As the curtain of slurry accelerates, it additionally becomes thinner. The spillway 73 has a lip 75 that is positioned immediately adjacent to the inner surface 36 as the screen 20 moves downward so that the slurry passes from the lip 75 and moves downward against the moving inner surface 36 as illustrated in FIG. 6. Preferably the slurry as it leaves the lip 75 has accelerated to a velocity of between five feet per second and thirty feet per second and preferably between ten feet per second and fifteen feet per second as it engages the inner surface 36. Since the inner surface 36 adjacent the lip 75 is moving downward and inward, the slurry is caused to flow down the inner surface 36 progressively deaccelerating as the slurry passes down the decreasing slope of the inner surface as illustrated in FIG. 6. This is an extremely important feature so that the slurry in effect pushes solid material forward on the inner surface 36 as the inner surface is moving so that the solid material does not immediately build up on the inner surface 36. This is a self-cleaning feature. As illustrated in FIG. 6, the slurry curtain initially contacts the inner surface 36 at an initial contact location 79. The slurry curtain progressively decreases in acceleration, pushing the solid material forward until the solid material begins to build up at a build up location 81. The distance between locations 79 and 81 is illustrated by the letter "X". Between locations 79 and 81 liquid within the slurry begins to pass through the apertures from the inner surface 36 to the outer surface 38 with the liquid flowing down the outer surface 38. Consequently, as the slurry curtain flows from the initial contact location 79 to the build up location 81, liquid is progressively removed from the slurry and the slurry is of a sufficient velocity to push the solid material forward to cleanse the inner surface 36 between locations 79 and 81. It should be noted that the tangential velocity of the slurry curtain on the inner surface 36 between locations 79 and 81 is greater than the rotational speed of the strainer screen 20. As the material builds up at location 81, the screen moves forward to move the solid material in the counterclockwise direction as illustrated in FIG. 6 for further processing.

The expansion tank 60 further includes an overflow tank 84 for receiving excess slurry that does not pass over the weir 71 and returns the unprocessed slurry to the slurry source. An overflow tank 84 has an adjustable gate 86 as illustrated in FIGS. 4 and 5 that may be raised or lowered to adjust the thickness of the slurry curtain as it passes over the weir 71. The adjustable gate 86 may be adjusted up and down depending upon the consistency and viscosity of the slurry and its constituents to obtain maximum efficiency.

The overflow tanks 84 are interconnected by a return manifold 88 that is illustrated in FIG. 5 in which the return manifold 88 returns the unprocessed slurry that passes over the adjustable gate 86 to the slurry source. Cross braces 89 (FIGS. 2-4) are mounted between the return manifold 88 and inlet manifold 52 to rigidly support the manifolds interiorly within the cylindrical screen means 18.

Rotary screen separator 10 includes a compression roller 90 that is freely mounted within cylindrical screen means 80 for riding on the inner surface 36 adjacent the lower profile for compressing the solid material against the inner surface 36 to squeeze additional liquid from the solid material as the screen 20 passes along the bottom of the circular trajectory. It should be noted that the compression roller is free to move in any angular direction with respect to the moving inner surface 32 and is able to rotate about a freely movable axis. The compression roller is preferably constructed of a high density plastic tube filled with solid materials such as concrete. The compression roller 90 is quite heavy to compress the solid material against the inner surface 36. It should be noted that more than one compression roller may be mounted within the interior of the cylindrical screen means 18. Because of gravity, the compression roller 90 tends to seek its lowest elevation with the screen means 18.

The rotary screen separator 10 further includes a solids removal means 92 that is mounted in the interior of the cylindrical screen means 18 for removing the solid material from the inner surface 36. The solids removal means 92 is positioned downstream of the roller 90 for removing the solids from the inner surface 36 before the inner surface ascends above the rotational axis. In the preferred embodiment, the solids removal means 92 is comprised of an auger 94 that is mounted axially within the cylindrical screen means 18 along the length of the cylindrical screen means for engaging the solid material and conveying the solid material axially along the inner surface to one end of the cylindrical screen means 18. The solids removal means 92 further includes a curved scraper 97 that forms part of the auger housing in which the curved scraper engages the inner surface 36 and scrapes the remaining solid material from the inner surface causing the solid material to pass along the inside surface of the curved scraper 97 and onto the auger 94. The auger 94 is rotated in a direction to compress the solid materials between the inner surface 36 and the auger and between the auger and the curved scraper 97 to further remove any liquid from the solid material. The scraper 97 is pivotally supported by a bracket 100 to the return manifold 88 as illustrated in FIGS. 2, 3 and 4. The weight of the curved scraper 97 causes the scraper to pivot downwardly with a sharp edge of the scraper engaging the inner surface 36 to scrape the solid material away from the inner surface.

The separator 10 further includes a liquid catch basin 102 (FIG. 1) that is positioned below the cylindrical screen means 18 for receiving the liquid as it passes through the apertures and drips or flows from the outer surface 38. The catch basin has an outlet 103 for draining the liquid or fluent friom the separator. From the auger, solids may be directed downward by gravity onto the ground or they may descend into a solids receptacle 105 as illustrated in FIG. 1.

It should be noted that the rotary screen separator as illustrated is extremely compact and efficient for handling a high volume of slurry in a very efficient manner to rapidly separate the liquid from the solids in a relatively self-cleaning manner. The rotary screen separator 10 is quite easy to maintain and to service.

It should be appreciated that the above identified embodiment is merely illustrative of the principals of this invention and that numerous embodiments may be readily devised by those skilled in the art without deviating therefrom. Therefore, only the following claims are intended to define and limit this invention.

I claim:

1. A rotary screen separator for separating solids from a slurry of liquid and solids, comprising:

a frame;

a cylindrical screen means mounted on the frame for rotation about a substantially horizontal axis;

drive means operatively connected to the cylindrical screen means for rotating the cylindrical screen means about said axis;

said cylindrical screen means having a curved straining screen with a concave inner screen surface and a convex outer screen surface;

slurry feed means mounted within the interior of the cylindrical screen means;

said slurry feed means comprising:

(a) an expansion tank mounted within the interior of the cylindrical screen means for receiving the slurry;

(b) said expansion tank having a weir at a desired elevation with respect to the rotational axis for permitting the slurry to flow thereover in a curtain when the elevation of the slurry in the expansion tank exceeds the elevation of the weir;

(c) a spillway operatively connected to the weir for directing the slurry curtain radially outward and downward toward the screen to enable the slurry to accelerate to the desired slurry velocity and to decrease the thickness of the slurry curtain as the slurry accelerates;

(d) said spillway having a terminating lip means adjacent the downward path of the inner screen surface of the moving straining screen at a sufficient velocity as the straining screen is moving in a curved downward path (1) to enable the liquid to pass through the straining screen from the inner screen surface to the outer screen surface to progressively separate the liquid from the solids as the cylindrical screen means rotates about the axis, and (2) to enable the flowing slurry curtain to push the solids forward along the inner screen surface in the curved downward path to facilitate the liquid/solid separation.

2. The rotary screen separator as defined in claim 1 wherein the drive means rotates the cylindrical screen means with the inner screen surface moving at a desired screen tangential velocity and wherein the feeding means directs the flowing slurry curtain against the inner screen surface at a tangential slurry velocity greater than the tangential velocity of the moving straining screen to push the solids forward in the curved downward path on the inner screen surface.

3. The rotary screen separator as defined in claim 1 wherein the feeding means directs the flowing slurry current against the moving straining screen at a tangential velocity of between five feet per second and thirty feet per second.

4. The rotary screen separator as defined in claim 1, wherein the drive means rotates the cylindrical screen means with the straining screen moving in a circular path about the rotational axis.

5. The rotary screen separator as defined in claim 4 wherein the slurry feeding means directs the slurry curtain against the straining screen as the straining screen is moving downward below the rotational axis.

6. The rotary screen separator as defined in claim 1 further comprising a freely movable compression roller mounted in the interior of the cylindrical screen means for unrestrained free annular movement with the cylindrical screen means to compress the solids against the inner screen surface to further separate residual liquid from the solids.

7. The rotary screen separator as defined in claim 1 further comprising solids removal means within the interior of the rotating cylindrical screen means engaging the moving straining screen for further compressing the solids against the inner surface to remove residual liquid therefrom and for removing the solids from the moving inner surface.

8. The rotary screen separator as defined in claim 7 wherein the solids removal means includes a rotating auger extending substantially parallel with the axis for engaging the solids on the inner surface and compressing the solids against the inner surface while moving the solids axially along the auger.

9. The rotary screen separator as defined in claim 8 wherein the solids removal means includes a scraper means associated with the auger for scraping the solids from the inner screen surface and directing the solids into the auger to remove the solids from the separator.

10. The rotary screen separator as defined in claim 1 wherein the expansion tank has a flow baffle therein operatively associated with the inlet manifold to stabilize the flow of the slurry in the expansion tank.

11. The rotary screen separator as defined in claim 1 wherein the expansion tank has an overflow gate for permitting excess slurry to be removed from the expansion tank.

12. The rotary screen separator as defined in claim 11 wherein the overflow gate is vertically adjustable in relationship to the weir to adjust the thickness of the slurry curtain passing over the weir and down the spillway.

* * * * *